US011949307B2

United States Patent
Li et al.

(10) Patent No.: US 11,949,307 B2
(45) Date of Patent: Apr. 2, 2024

(54) LINEAR VIBRATION MOTOR WITH IRON CORE AND POLE PIECES WITH GROOVE ON POLE PIECE FACING CONNECTING PART BETWEEN MAGNETS

(71) Applicant: AAC Microtech (Changzhou) Co., Ltd., Changzhou (CN)

(72) Inventors: Ziang Li, Shenzhen (CN); Lubin Mao, Shenzhen (CN); Zhiyong Cui, Shenzhen (CN); Jie Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 283 days.

(21) Appl. No.: 17/542,526

(22) Filed: Dec. 6, 2021

(65) Prior Publication Data
US 2022/0352800 A1 Nov. 3, 2022

(30) Foreign Application Priority Data
Apr. 29, 2021 (CN) .......................... 202120923315.9

(51) Int. Cl.
*H02K 33/02* (2006.01)
(52) U.S. Cl.
CPC .................... *H02K 33/02* (2013.01)
(58) Field of Classification Search
CPC ........ H02K 33/00; H02K 33/02; H02K 33/04; H02K 33/06; H02K 33/08; H02K 33/10; H02K 33/16; H02K 33/18; H02N 1/00; H02N 1/002; H02N 1/04
USPC .. 310/12, 12.12, 12.01, 12.03, 12.13, 12.16, 310/12.26, 15–29
See application file for complete search history.

(56) References Cited

U.S. PATENT DOCUMENTS

| 7,671,493 | B2 * | 3/2010 | Takashima | .............. G06F 3/016 310/15 |
| 7,859,144 | B1 * | 12/2010 | Sahyoun | ................ H02K 33/16 335/229 |
| 8,278,786 | B2 * | 10/2012 | Woo | ....................... H02K 33/16 310/15 |
| 8,648,502 | B2 * | 2/2014 | Park | ....................... H02K 33/16 310/15 |
| 8,941,272 | B2 * | 1/2015 | Hong | ..................... H02K 33/18 310/15 |

(Continued)

FOREIGN PATENT DOCUMENTS

CN 209389903 U * 9/2019 ............... H02K 1/34

*Primary Examiner* — Maged M Almawri
(74) *Attorney, Agent, or Firm* — W&G Law Group

(57) ABSTRACT

The present disclosure discloses a linear motor having a housing with an accommodation space, a vibration unit and a driving unit received in the accommodation. The vibrator unit includes a weight with a receiving space and a magnet unit fixed on the weight and inside the receiving space. The driving unit includes an iron core received in the receiving space, two pole pieces respectively fixed on two opposite ends of the iron core along a vibration direction and a coil wound around the iron core. A groove is provided on the pole piece and faces the magnet unit along a first direction perpendicular with the vibration direction. The distance between the pole piece and the magnet unit increases, effectively decreasing the magnetic attraction force between the pole piece and magnet unit and avoiding the non-linear vibration of the linear vibration motor.

7 Claims, 6 Drawing Sheets

(56) References Cited

U.S. PATENT DOCUMENTS

| | | | | |
|---|---|---|---|---|
| 9,024,489 B2* | 5/2015 | Akanuma | H02K 33/16 | 310/15 |
| 9,225,265 B2* | 12/2015 | Oh | G06F 3/016 | |
| 9,306,429 B2* | 4/2016 | Akanuma | H02K 33/16 | |
| 9,543,816 B2* | 1/2017 | Nakamura | H02K 33/00 | |
| 9,748,827 B2* | 8/2017 | Dong | H02K 33/16 | |
| 9,815,085 B2* | 11/2017 | Chun | G06F 3/016 | |
| 9,912,217 B2* | 3/2018 | Xu | H02K 33/16 | |
| 9,948,170 B2* | 4/2018 | Jun | H02K 33/00 | |
| 10,008,894 B2* | 6/2018 | Mao | H02K 1/34 | |
| 10,033,257 B2* | 7/2018 | Zhang | H02K 33/12 | |
| 10,063,128 B2* | 8/2018 | Wang | H02K 33/16 | |
| 10,160,010 B2* | 12/2018 | Chun | H02K 33/16 | |
| 10,270,304 B2* | 4/2019 | Wang | H02K 33/16 | |
| 10,307,791 B2* | 6/2019 | Xu | B06B 1/045 | |
| 10,328,461 B2* | 6/2019 | Xu | B06B 1/045 | |
| 10,447,129 B2* | 10/2019 | Mao | H02K 33/00 | |
| 10,483,451 B2* | 11/2019 | Wang | H10N 30/85 | |
| 10,486,196 B2* | 11/2019 | Chai | B06B 1/045 | |
| 10,491,090 B2* | 11/2019 | Zu | H02K 33/16 | |
| 10,596,595 B2* | 3/2020 | Hua | B06B 1/045 | |
| 10,596,596 B2* | 3/2020 | Ling | B06B 1/045 | |
| 10,674,278 B2* | 6/2020 | Zhou | H04R 9/025 | |
| 10,763,732 B2* | 9/2020 | Liu | H02K 33/18 | |
| 10,886,827 B2* | 1/2021 | Liu | H02K 33/14 | |
| 11,025,148 B2* | 6/2021 | Tang | H02K 33/12 | |
| 11,050,334 B2* | 6/2021 | Mori | H02K 33/18 | |
| 11,081,950 B2* | 8/2021 | Zhang | H02K 33/18 | |
| 11,211,859 B2* | 12/2021 | Tang | H02K 33/18 | |
| 11,271,465 B2* | 3/2022 | Kitahara | H02K 33/16 | |
| 11,515,774 B2* | 11/2022 | Yan | H02K 33/16 | |
| 11,626,786 B2* | 4/2023 | Maeda | H02K 33/02 | 310/29 |
| 11,641,152 B2* | 5/2023 | Cui | H02K 35/02 | 310/28 |
| 2006/0131965 A1* | 6/2006 | Friedland | H02K 26/00 | 310/12.22 |
| 2009/0267423 A1* | 10/2009 | Kajiwara | H02K 33/02 | 310/38 |
| 2010/0213773 A1* | 8/2010 | Dong | H02K 33/16 | 310/25 |
| 2011/0018364 A1* | 1/2011 | Kim | H02K 33/18 | 310/20 |
| 2011/0062803 A1* | 3/2011 | Lee | H02K 33/18 | 310/29 |
| 2011/0068640 A1* | 3/2011 | Choi | H02K 5/04 | 310/25 |
| 2011/0089772 A1* | 4/2011 | Dong | H02K 33/16 | 310/25 |
| 2011/0115311 A1* | 5/2011 | Dong | H02K 33/16 | 310/28 |
| 2011/0133577 A1* | 6/2011 | Lee | H02K 33/18 | 310/15 |
| 2012/0025633 A1* | 2/2012 | Lee | H04N 23/55 | 310/12.16 |
| 2012/0153748 A1* | 6/2012 | Wauke | H02K 33/16 | 310/25 |
| 2012/0187780 A1* | 7/2012 | Bang | H02K 33/16 | 310/25 |
| 2012/0313459 A1* | 12/2012 | Zhang | H02K 33/18 | 310/25 |
| 2013/0099600 A1* | 4/2013 | Park | B06B 1/045 | 310/15 |
| 2015/0123498 A1* | 5/2015 | Yang | H02K 33/16 | 310/25 |
| 2016/0173990 A1* | 6/2016 | Park | H04R 9/043 | 381/354 |
| 2016/0218607 A1* | 7/2016 | Oh | H02K 33/16 | |
| 2016/0226363 A1* | 8/2016 | Mao | H02K 33/16 | |
| 2016/0336842 A1* | 11/2016 | Chun | H02K 33/16 | |
| 2017/0033653 A1* | 2/2017 | Wang | H02K 33/16 | |
| 2017/0033657 A1* | 2/2017 | Mao | H02K 33/16 | |
| 2017/0033672 A1* | 2/2017 | Xu | H02K 33/16 | |
| 2017/0104401 A1* | 4/2017 | Umehara | H02K 33/06 | |
| 2017/0110920 A1* | 4/2017 | Mao | H02K 1/34 | |
| 2017/0117788 A1* | 4/2017 | Hou | H02K 1/34 | |
| 2017/0179804 A1* | 6/2017 | Xu | H02K 33/00 | |
| 2017/0288519 A1* | 10/2017 | Kim | H02K 33/16 | |
| 2017/0288524 A1* | 10/2017 | Jin | H02K 5/225 | |
| 2017/0341108 A1* | 11/2017 | Mao | H02K 33/00 | |
| 2017/0373578 A1* | 12/2017 | Wu | H02K 33/16 | |
| 2018/0021812 A1* | 1/2018 | Akanuma | H02K 33/00 | 310/25 |
| 2018/0241292 A1* | 8/2018 | Zu | H02K 33/16 | |
| 2018/0248457 A1* | 8/2018 | Shi | F16F 15/08 | |
| 2018/0297061 A1* | 10/2018 | Mao | H02K 5/04 | |
| 2018/0297062 A1* | 10/2018 | Huang | H02K 11/33 | |
| 2018/0297071 A1* | 10/2018 | Xu | B06B 1/045 | |
| 2018/0342937 A1* | 11/2018 | Mao | H02K 33/02 | |
| 2019/0157958 A1* | 5/2019 | Mao | H02K 33/12 | |
| 2019/0207496 A1* | 7/2019 | Takahashi | H02K 33/02 | |
| 2019/0305637 A1* | 10/2019 | Suzuki | B06B 1/045 | |
| 2020/0044533 A1* | 2/2020 | Tang | H02K 33/12 | |
| 2020/0044539 A1* | 2/2020 | Tang | H02K 33/14 | |
| 2020/0044540 A1* | 2/2020 | Tang | H02K 33/16 | |
| 2020/0044546 A1* | 2/2020 | Zhang | H02K 33/16 | |
| 2020/0044548 A1* | 2/2020 | Tang | H02K 33/18 | |
| 2020/0195115 A1* | 6/2020 | Zhang | H02K 33/16 | |
| 2020/0195116 A1* | 6/2020 | Zhang | H02K 33/18 | |
| 2020/0212774 A1* | 7/2020 | Ling | H02K 1/34 | |
| 2020/0212776 A1* | 7/2020 | Ling | H02K 33/16 | |
| 2020/0212778 A1* | 7/2020 | Tao | H02K 33/18 | |
| 2023/0238866 A1* | 7/2023 | Li | H02K 33/04 | 310/28 |

* cited by examiner

LINEAR VIBRATION MOTOR WITH IRON CORE AND POLE PIECES WITH GROOVE ON POLE PIECE FACING CONNECTING PART BETWEEN MAGNETS

FIELD OF THE PRESENT DISCLOSURE

The present disclosure relates to tactile feedback technologies, especially relates to a linear vibration motor applied in mobile device.

DESCRIPTION OF RELATED ART

With the development of electronic technologies, portable consumable electronic products are increasingly popular, such as mobile phone, hand-held game console, navigating device or hand-held multimedia entertainment equipment, in which a linear vibration motor is generally used for system feedback, such as call reminder, message reminder, navigation reminder of mobile phone, vibration feedback of game console. To meet the demand of such a wide application, the vibration motor shall have high performance and long life.

A linear vibration motor of related art includes a housing with an accommodation space, a vibration unit received in the accommodation space and a driving unit fixed on the housing. The driving unit includes an iron core, two pole pieces fixed on two ends of the iron core and a coil wound around the iron core, respectively. The vibration unit includes a weight and a magnet fixed on the weight. The pole piece faces the magnet.

However, in the linear vibration motor in the related art, when the coil is power on, the pole piece is polarized, resulting in magnetic attraction force along a non-vibration direction between the pole piece and the magnet. The linear vibration motor may vibrate deviating from the vibration direction, which is detrimental to the vibration feedback of the linear vibration motor and result in vibration distortion.

Therefore, it is necessary to provide an improved linear vibration motor to overcome the problems mentioned above.

SUMMARY OF THE INVENTION

The present disclosure provides a linear vibration motor with lower vibration distortion.

The linear vibration motor includes a housing with an accommodation space, a vibration unit received in the accommodation space, and a driving unit received in the accommodation space, fixed on the housing and configured to drive the vibration unit to vibrate; the vibration unit includes a weight with a receiving space, a magnet unit fixed on the weight and received in the receiving space, and an elastic member configured to suspend the weight in the accommodation space; the driving unit includes an iron core received in the receiving space, two pole pieces separately fixed on two opposite ends of the iron core along a vibration direction, and a coil wound around the iron core; the magnet unit is arranged on one side of the coil along a first direction perpendicular with the vibration direction; the pole piece comprises a first surface facing the magnet unit; a groove is formed by denting the first surface away from the magnet unit along the first direction.

Further, the magnet unit includes three magnets arranged successively along the vibration direction, forming a connecting part between every adjacent two magnets; the groove faces the connecting part along the first direction.

Further, the groove penetrates the pole piece along a second direction perpendicular with both of the vibration direction and the first direction.

Further, a section of the groove along the first direction is one of rectangle, arc and V-shape.

Further, a projection of the iron core and the coil along the vibration direction overlaps with the pole piece.

Further, the vibration unit includes a magnetic plate arranged between the magnet and the weight, a length of the magnetic plate along the vibration direction is no more than a length of the magnet along the vibration direction.

Further, a magnetization direction of every magnet is parallel with the first direction; the magnetization direction of every two adjacent magnet is opposite.

Further, the magnet unit includes two magnet groups, the two magnet groups are respectively arranged on two opposite side of the coil along the first direction; each magnet group includes three magnets arranged successively along the vibration direction.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
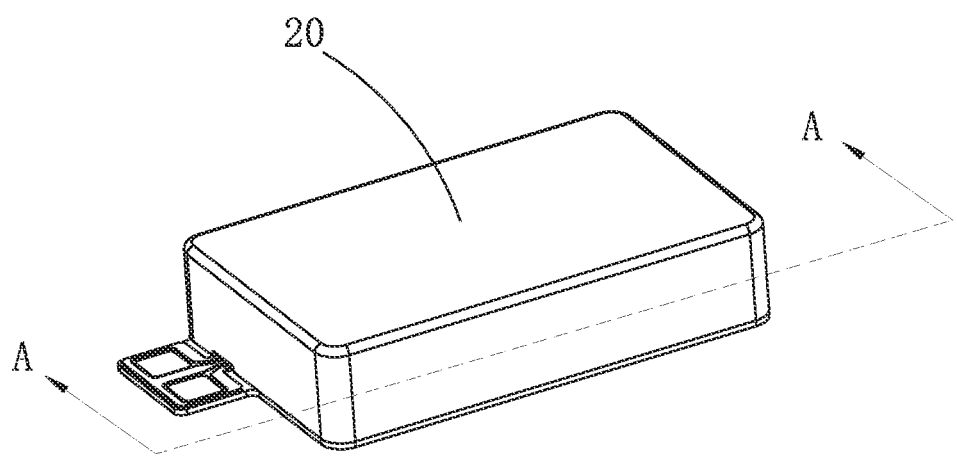
FIG. 1 is an isometric view of a linear vibration motor in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

It should be noted that the description of "first", "second" and the like in the present disclosure is only used for description purposes, and cannot be understood as indicating or implying its relative importance or implying the number of indicated technical features. Thus, a feature defined as "first" or "second" may include at least one such feature, either explicitly or implicitly. In addition, the technical solutions among the various embodiments can be combined with each other, but it must be based on that it can be realized by ordinary technicians. When the combination of the technical solutions is contradictory or cannot be realized, it should be considered that the combination of the technical solutions does not exist, nor is it within the scope of protection required by the present disclosure.

Please refer to FIGS. 1-6 together, a linear vibration motor 100 provided by an exemplary embodiment of the present disclosure includes a housing 20 with an accommodation space 10, a vibration unit 30 and a driving unit 40 both received in the accommodation space 10.

The housing 20 includes an upper cover 21 and a bottom cover 22 fixed on the upper cover 21 and covering an opening of the upper cover 21 to enclose the accommodation space 10.

Figure 2:
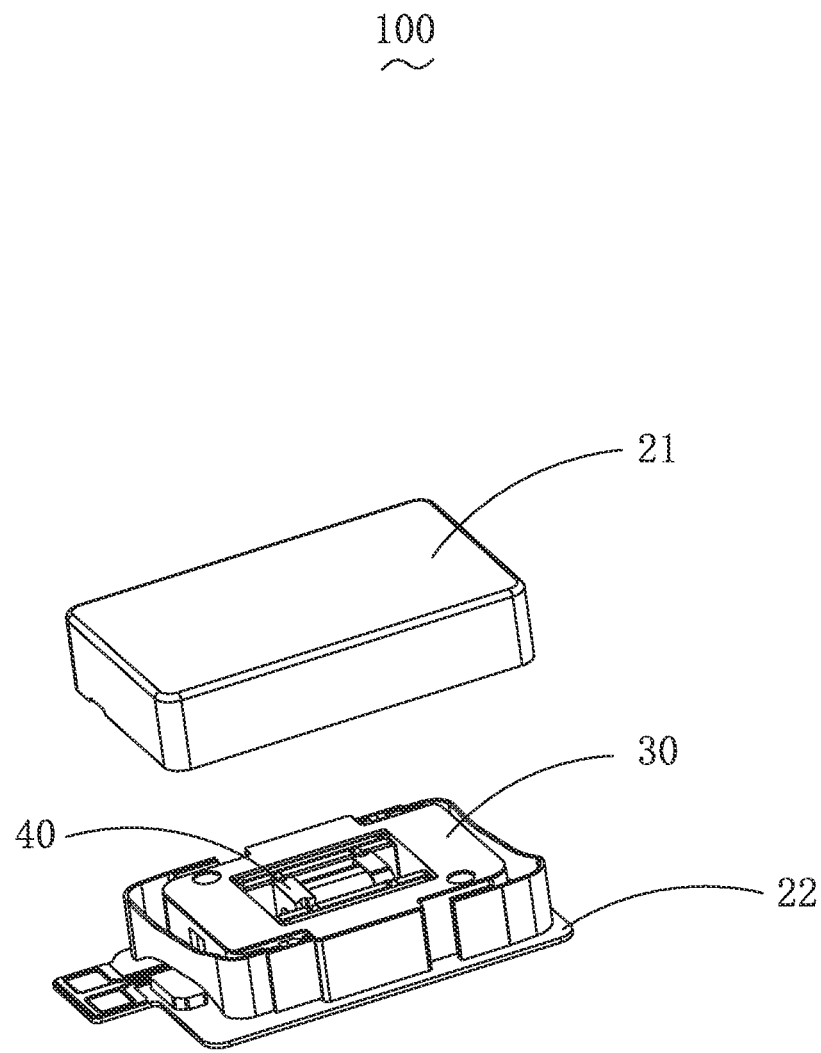
FIG. 2 is an exploded view of the linear vibration motor in FIG. 1.
Figure 3:
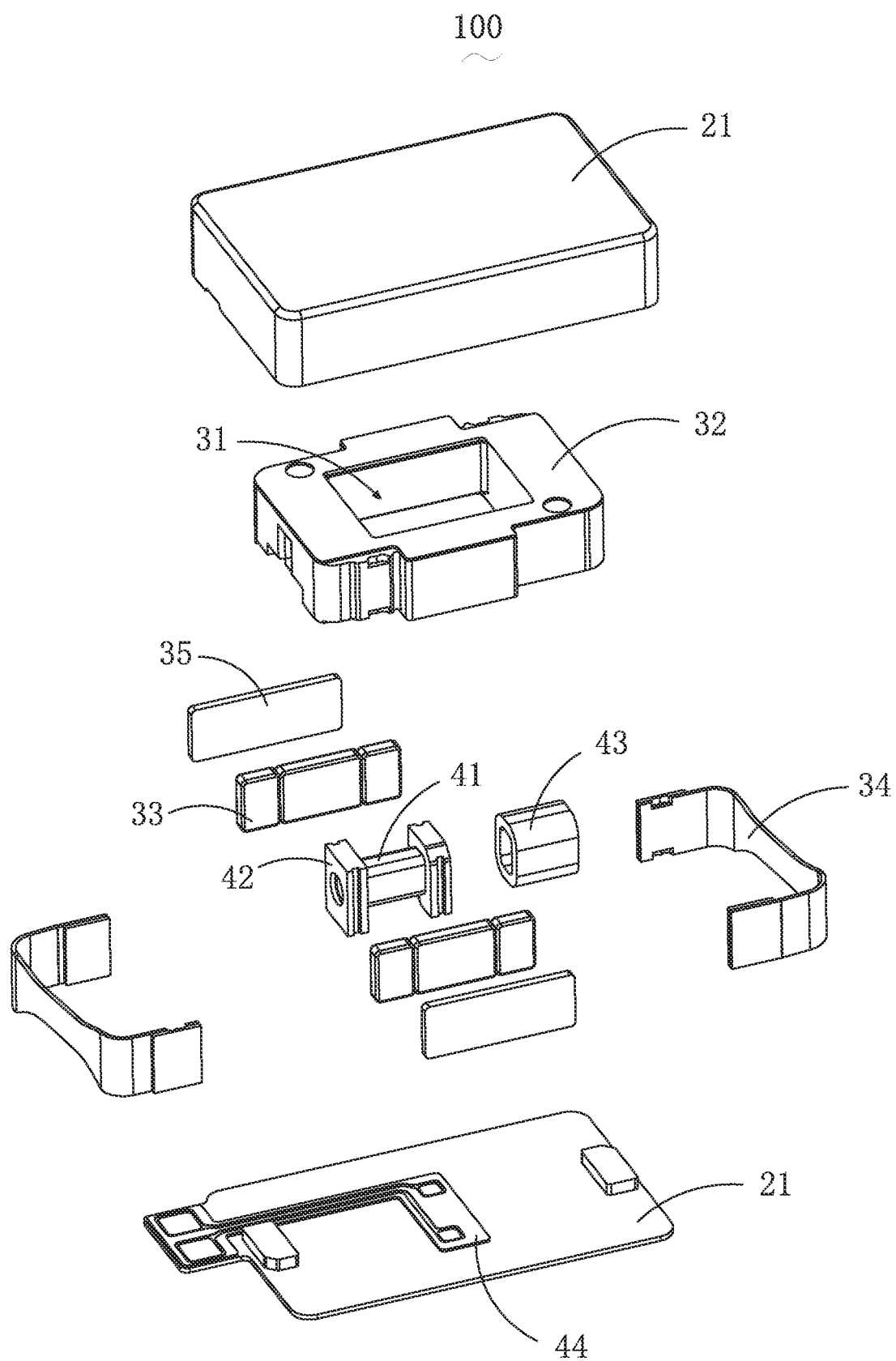
FIG. 3 is an exploded view of the linear vibration motor in FIG. 1
Figure 4:
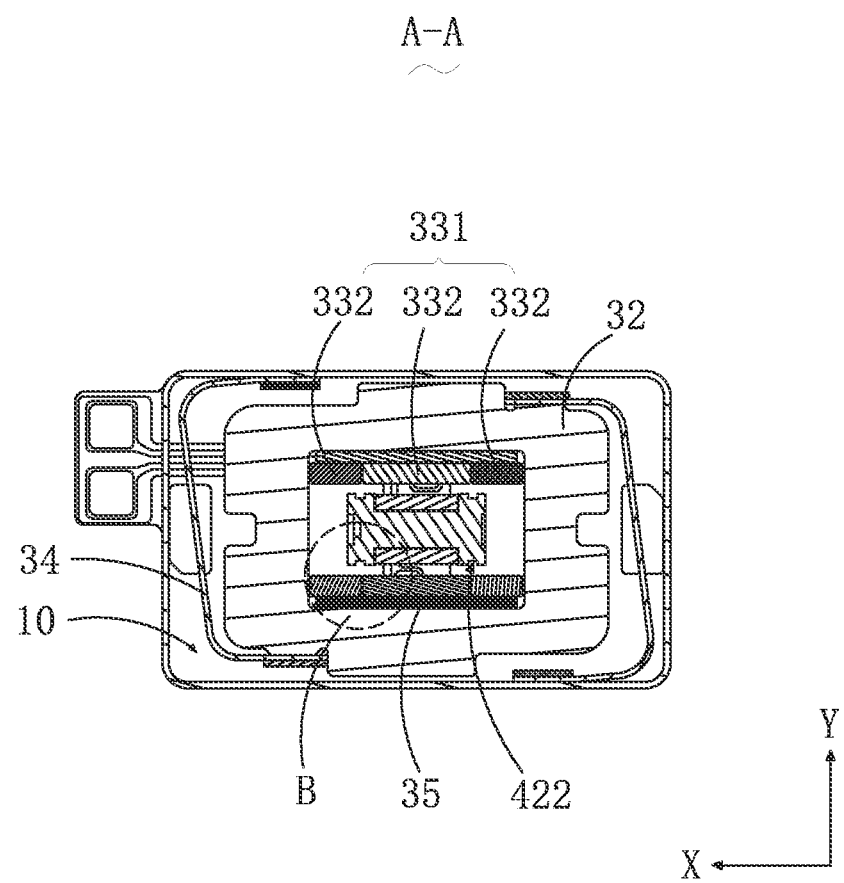
FIG. 4 is a cross-sectional view of the linear vibration motor taken along line A-A in FIG. 1.
Figure 5:
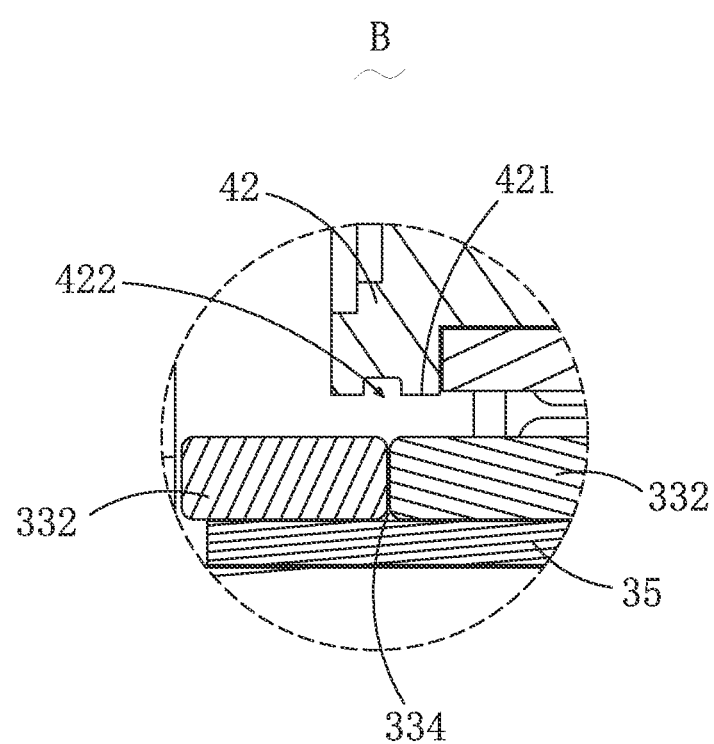
FIG. 5 is an enlarged view of the part B in FIG. 4.
Figure 6:
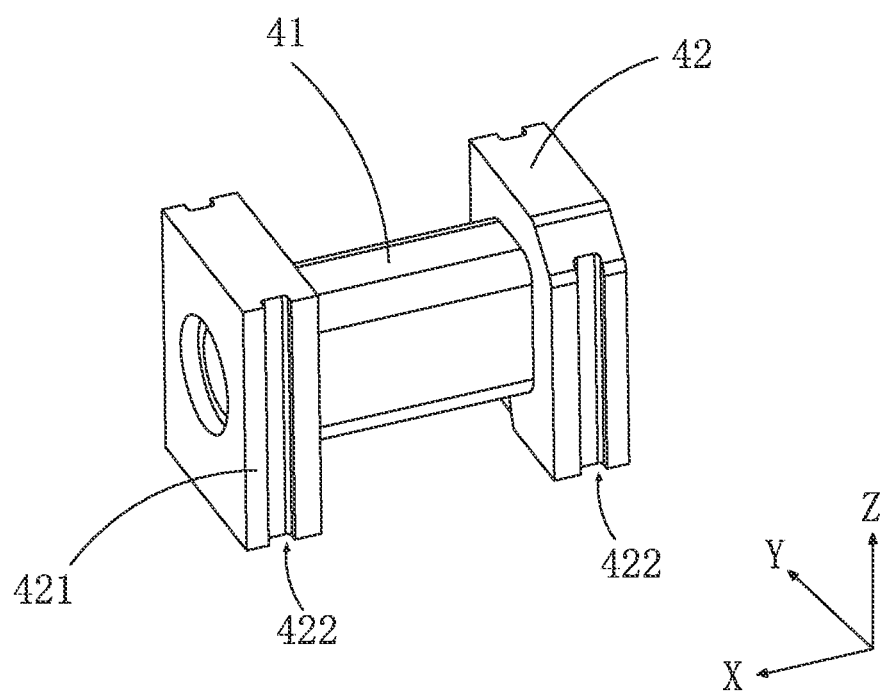
FIG. 6 is an enlarged isometric view of an iron core and two pole pieces of the linear vibration motor in FIG. 1.

Please refer to FIG. 2-FIG. 4, the vibration unit 30 includes a weight 32 with a receiving space 31, a magnet unit 33 fixed on the weight 32 and received in the receiving space 31, and an elastic member 34 configured to suspend the weight 32 in the accommodation space 10. One end of the elastic member 34 is fixed on the weight 32 and the other end of the elastic member 34 is fixed on the upper cover 2. The weight 32 and the magnet unit 33 reciprocate along a vibration direction, by which provides vibration feedback. It can be understood that the linear vibration motor 100 includes two elastic members 34 respectively located on two opposite sides of the weight 32 along the vibration direction. Furthermore, the vibration unit 30 includes a magnetic plate 35 arranged between the magnet unit 33 and the weight 32. The magnetic plate 35 converges the magnetic induction line of the magnet unit 33 and avoids leakage of the magnetic induction line of the magnet unit 33, thus strengthening the magnetic field of the magnet unit 33. Furthermore, a length of the magnetic plate 35 along the vibration direction is no more than a length of the magnet unit 33 along the vibration direction, thus effectively insuring the magnetic conductive ability of the magnetic plate 35. It can be understood that the magnetic plate 35 is made of magnetic conductive material.

The driving unit 40 includes an iron core 41 received in the receiving space 31, two pole pieces 42 respectively fixed on two opposite ends of the iron core 31 along the vibration direction, a coil 43 wound around the iron core 31 and a flexible print circuit board 44 electrically connecting the coil 43 and the external power supply. In this exemplary embodiment, a projection of the iron core 41 and the coil 43 along the vibration direction overlaps with the pole piece 42.

Please refer to FIG. 3 and FIG. 4, in this exemplary embodiment, more specifically, the magnet unit 33 includes two magnet groups 331 respectively arranged on two opposite side of the coil 43 along a first direction perpendicular with the vibration direction. Each magnet group 331 includes three magnets 332 arranged successively along the vibration direction. A magnetization direction of every magnet 332 is parallel with the first direction, and the magnetization direction of every two adjacent magnet 332 is opposite. In the related art, when the coil 43 is power on, the pole piece 42 is polarized, resulting in the magnetic attraction force along a non-vibration direction between the pole piece 42 and the magnet 332, especially between the pole piece 42 and the peripheral magnet 332. The linear vibration motor 100 may vibrate deviating from the vibration direction, which is detrimental to the vibration feedback of the linear vibration motor and result in vibration distortion.

In this exemplary embodiment, the pole piece 42 faces the magnet unit 33 along the first direction. Specifically, the pole piece 42 includes a first surface 421 facing the magnet unit 33. A groove 422 is formed by denting the first surface 421 away from the magnet unit 33 along the first direction. It can be understood that part of the first surface 421 dents. The distance between the bottom of the groove 422 between the magnet unit 33 is larger than the distance between the magnet unit 33 and the first surface 421. Therefore, with the increase of the distance between the pole piece 42 and the magnet unit 33 and the mass decrease of the pole piece 42, the magnetic attraction force between the pole piece 42 and magnet unit 33 decreases, effectively avoiding the non-linear vibration, decreasing the vibration distortion and optimizing the vibration ability of the linear vibration motor 100. It can be understood that the pole piece includes two first surface 421 so that one pole piece includes two grooves 422.

In this exemplary embodiment, the three magnets 332 are arranged successively along the vibration direction, forming a connecting part 334 between every two adjacent magnet 332. Preferably, the groove 422 faces the connecting part 334 along the first direction. In this way, the vibration distortion of the linear vibration motor 100 can be decreased to the utmost. Specifically, the three magnets 332 are individual arranged. In other embodiments, the three magnets 332 can be three adjacent magnetization zones set at intervals of one piece of magnet. In this situation, the connecting part 334 is the non-magnetic area between every two interval magnetization zones.

Furthermore, the groove 422 penetrates the pole piece 42 along a second direction. The second direction is perpendicular with the vibration direction and the first direction at the same time. A length of the groove 422 along the second direction equal that of the pole piece 42 along the second direction. Please refer to FIG. 4-FIG. 6, it can be understood that the vibration direction is an X-axis direction, the first direction is a Y-axis direction and the second direction is a Z-axis direction. The Z-axis direction is the vertical direction.

In this exemplary embodiment, a section of the groove 422 along the first direction is rectangle. In other embodiments, the section of the groove 422 can be arc, V-shape or other irregular shape.

Compared with the related art, in the embodiment of the present disclosure, the linear vibration motor includes a groove formed on the pole piece and facing the magnet, thus increasing the distance between the pole piece and the magnet and decreasing the mass of the pole piece. With the distance increase the mass decrease mentioned-above, the magnetic attraction force between the pole piece and magnet decreases, effectively avoiding the non-linear vibration, decreasing the vibration distortion and optimizing the vibration ability of the linear vibration motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A linear vibration motor comprising:
a housing with an accommodation space;
a vibration unit received in the accommodation space, comprising:
a weight with a receiving space;
a magnet unit fixed on the weight and received in the receiving space; and
an elastic member configured to suspend the weight in the accommodation space;

a driving unit received in the accommodation space, fixed on the housing and configured to drive the vibration unit to vibrate along a vibration direction, comprising:
an iron core received in the receiving space;
two pole pieces fixed on two opposite ends of the iron core along the vibration direction, respectively; and
a coil wound around the iron core; wherein
the magnet unit is arranged on one side of the coil along a first direction perpendicular with the vibration direction;
the pole piece comprises a first surface facing the magnet unit; the first surface dents away from the magnet unit along the first direction for forming a groove;
the magnet unit comprises three magnets arranged successively along the vibration direction, forming a connecting part between every adjacent two magnets; the groove faces the connecting part along the first direction.

2. The linear vibration motor as described in claim 1, wherein the groove penetrates through the pole piece along a second direction perpendicular with both of the vibration direction and the first direction.

3. The linear vibration motor as described in claim 1, wherein a section of the groove along the first direction is one of rectangle, arc and V-shape.

4. The linear vibration motor as described in claim 1, wherein a projection of the iron core and the coil along the vibration direction overlaps with the pole piece.

5. The linear vibration motor as described in claim 1, wherein the vibration unit further comprises a magnetic plate arranged between the magnet and the weight, a length of the magnetic plate along the vibration direction is no more than a length of the magnet along the vibration direction.

6. The linear vibration motor as described in claim 1, wherein a magnetization direction of every magnet is parallel with the first direction; the magnetization direction of every two adjacent magnet is opposite.

7. The linear vibration motor as described in claim 1, wherein the magnet unit comprises two magnet groups, the two magnet groups are respectively arranged on two opposite side of the coil along the first direction; each magnet group comprises three magnets arranged successively along the vibration direction.

* * * * *